United States Patent
Webb

[11] 3,727,224
[45] Apr. 10, 1973

[54] METHOD AND APPARATUS FOR POST THRESHOLD CANCELLATION

[75] Inventor: William R. Webb, Baltimore, Md.

[73] Assignee: Westinghouse Electric Corporation, Pittsburgh, Pa.

[22] Filed: Oct. 26, 1971

[21] Appl. No.: 192,519

[52] U.S. Cl. .................................343/7.7, 343/17.1
[51] Int. Cl. ................................................G01s 9/42
[58] Field of Search ...................343/7.7, 17.1, 5 PD

[56] References Cited

UNITED STATES PATENTS

| | | | |
|---|---|---|---|
| 3,386,093 | 5/1968 | Mooney, Jr. et al. | 343/7.7 |
| 3,267,468 | 8/1966 | Stull, Jr. | 343/7.7 |
| 3,383,683 | 5/1968 | Harriger et al. | 343/7.7 |
| 3,480,953 | 11/1969 | Shreve | 343/7.7 |
| 3,680,096 | 7/1972 | Bosc | 343/7.7 |
| 3,603,996 | 9/1971 | Murchison | 343/7.7 |

Primary Examiner—Benjamin A. Borchelt
Assistant Examiner—G. E. Montone
Attorney—F. H. Henson et al.

[57] ABSTRACT

A post threshold canceller for use in an airborne moving target indicator system increases the rejection of slow moving targets by a factor of at least three to one while presenting only a minimal reduction in visibility of faster targets. A set of plural pulse rate frequencies are employed. In addition to the cancellation afforded through use of notch filters, the invention provides for inhibiting all targets which appear out of a notch in each pulse rate frequency of the set. In a receiver, there are provided a corresponding plurality of data storage registers, each having a number of bit storage positions corresponding to the maximum number of range cells for the highest pulse rate frequency employed for a given pulse width. During the last interpulse period of each look, a steering circuit directs the received signals into the appropriate data storage registers, in continuous succession. Control and gating circuits include an inhibit storage register with means for synchronizing the recirculation of data in all registers, and steering and gating logic for successively clearing the oldest data from the data registers while identifying targets appearing out of a notch in each pulse rate frequency of the set, thereby to inhibit the target from producing a video output signal.

15 Claims, 2 Drawing Figures

PATENTED APR 10 1973  3,727,224
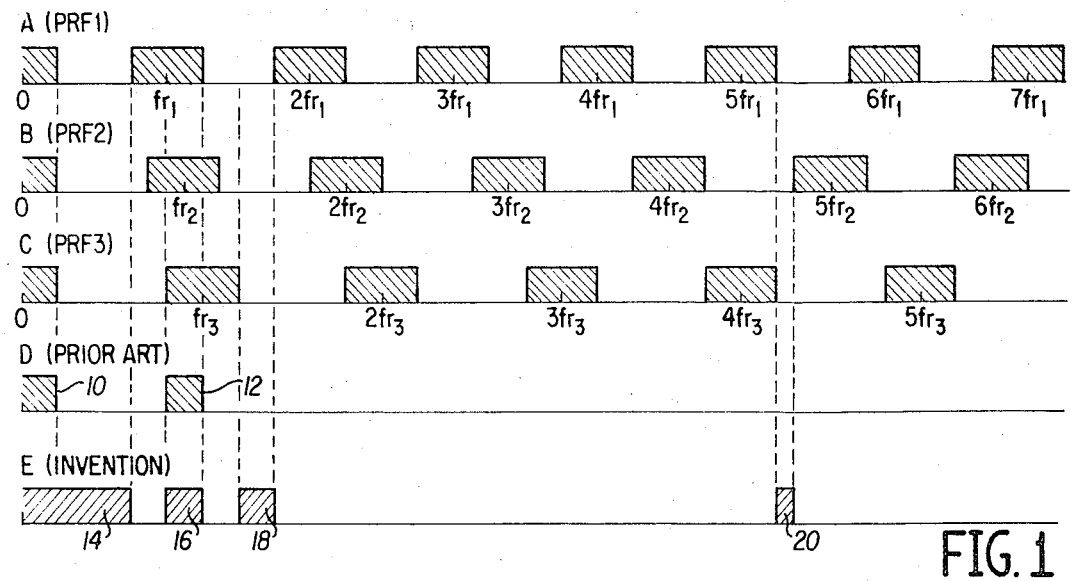
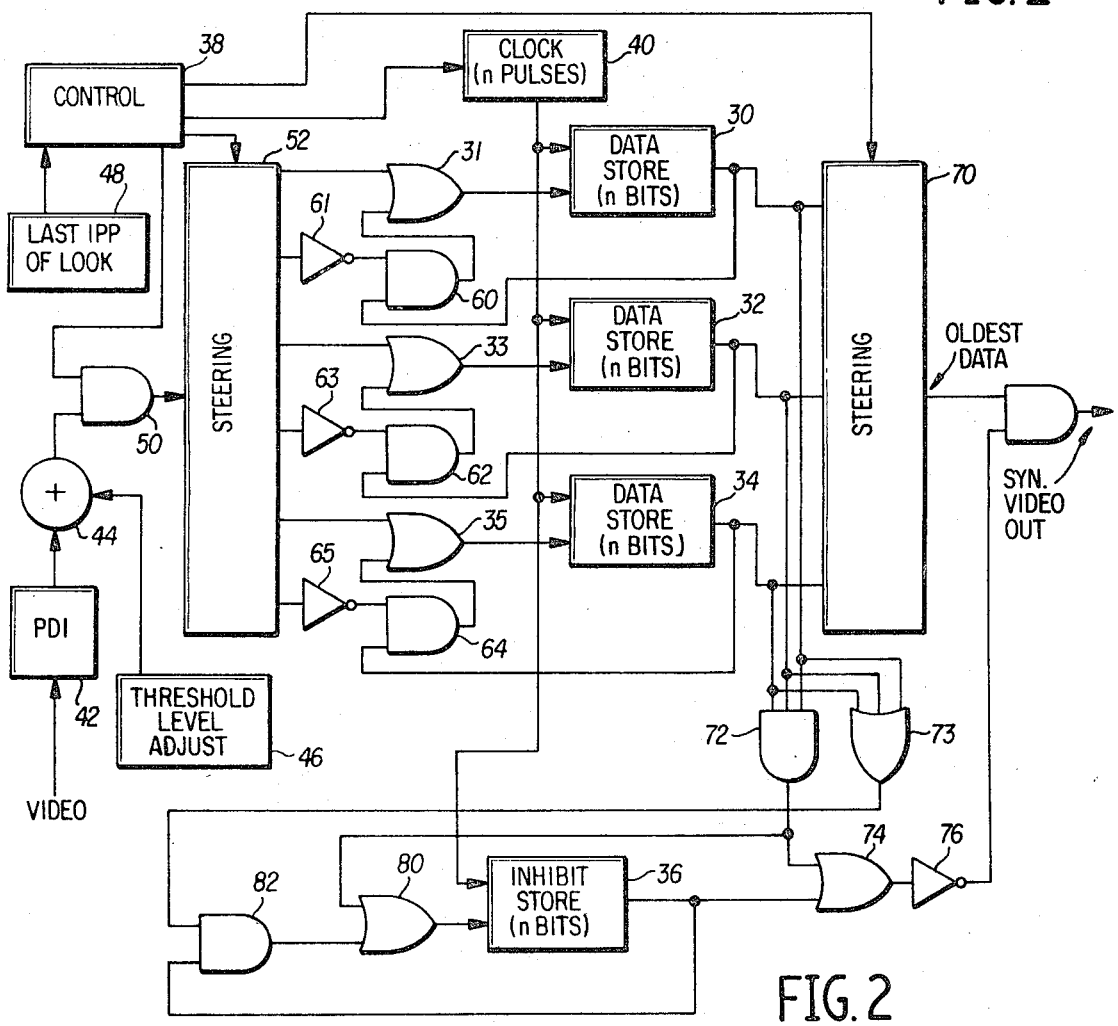

METHOD AND APPARATUS FOR POST THRESHOLD CANCELLATION

BACKGROUND OF THE INVENTION

1. Field of the Invention

This invention relates to coherent low pulse rate frequency radar systems of the airborne moving target indicator type, and more particularly to a system for increasing the rejection of low radial velocity targets, thereby to enhance the visibility of higher radial velocity targets.

2. State of the Prior Art

In radar systems of the type to which the invention is directed, it is well known to utilize suitable notch filters for eliminating stationary targets. Particularly, the notch filters are selected of suitable center frequency and band width such that the target signals representing stationary targets are centered in the notch filter and eliminated, or cancelled, from the received signal as processed for display purposes. To a limited degree and depending upon the band width of the notch filter, some slow moving targets are also eliminated.

In typical modern systems, the notch filters are periodic in frequency at the system pulse rate frequency (hereafter, PRF). Due to this effect, there result so-called blind speeds, wherein, for a given PRF, the target signal is cancelled by the effect of the notch filter, albeit the radial velocity of the target may be greatly in excess of the very low radial velocity target appearing within the base band region. Accordingly, it is known in the prior art to utilize a set of plural, different PRF's, wherein the PRF's are so selected as to minimize the possibility that a moving target signal will fall within a notch in more than one PRF. In addition, the notches themselves are generally made as narrow as possible to enhance the visibility of the targets.

A problem inherent in systems designed in this manner is that while the visibility of moving targets is enhanced in general, low radial velocity moving targets have a greater probability of appearing out of a notch in all PRF's than do the higher radial velocity targets. In fact, the higher radial velocity targets have an exceedingly small chance of appearing out of the notch in all PRF's. Thus the low radial velocity targets which tend to be moving ground vehicles and should be eliminated entirely from display, are of relatively greater visibility than the higher velocity targets intended to be displayed.

Sophisticated systems have been developed in the prior art for the purpose of inhibiting display of the lower radial velocity targets thereby to enhance the visibility of higher radial velocity targets. These systems, however, tend to be exceedingly complex, with attendant high cost, and frequently are of undesirable physical size for employment in airborne systems. The present invention overcomes these and other defects of prior art systems directed to the purpose of enhancing visibility of the higher radial velocity targets.

SUMMARY OF THE INVENTION

In accordance with the invention, rejection of low radial velocity targets is greatly increased over the prior art systems, thereby enhancing the visibility of higher radial velocity targets comprising the desired information of a display. A key feature of the technique of the invention is that the higher probability of the relatively lower radial velocity targets appearing out of a notch in all PRF's, is utilized for inhibiting those targets from the displayed video. Thus, the higher probability of the lower radial velocity targets of falling outside of a notch in all PRF's affords the basis of elimination of those targets from the ultimate video display output.

As is apparent, the decisions as to enabling or inhibiting display of a given target cannot be made until data from an entire dwell has been stored. The system of the invention, however, processes the video signals subsequent to integration of the signals for each look of a dwell and thresholding thereof; as a result, only one bit of amplitude per range cell in each PRF is required. Thus, the requirements for storage of the return signals are minimized. Accordingly, the system of the invention is characterized as a post threshold canceller and may be provided as a supplemental or add-on unit, applicable to any airborne moving target indicator system, and which allows all standard features of the radar system to be retained.

As before noted, the system and technique of the invention comprises a selection of a set of plural PRF's, and as to each of which there is afforded a corresponding data storage register. Each of the registers includes a number of storage positions corresponding to, or no greater than, the number of range cells in the highest PRF employed. Received video, subject to threshold level control is selectively gated, or steered, into each of the respectively corresponding data storage registers in continuous succession. A clock pulse signal controls the gating of the data into the registers and as well synchronizes the recirculation of the data in each register. An inhibit storage register is recirculated in synchronism with the data storage registers, and includes a corresponding number of bit storage positions. A control and gating system provides for comparing the data in corresponding storage positions of the plurality of registers in continuous succession, and produces an inhibit output for each instance wherein an information bit-representing a target signal-is stored in the corresponding bit storage positions of the recirculating data storage registers. An output steering system operative in conjunction with the inhibit register, provides for gating out the oldest stored target information. The input and output steering circuits thus are coordinated to permit, in continuous succession, the introduction of new target information into the data storage registers and the reading out of the oldest such information. As to each range cell, the inhibit is maintained until such time as a target signal is no longer present in any of the plural, corresponding bit storage positions of the data storage registers.

The system of the invention is of reduced complexity compared with prior art systems for enhancing the visibility of high speed moving targets and suppressing the visibility of low speed moving targets, is compact in size and efficient in operation and thus is ideally suited for use in airborne radar systems. Furthermore, it may be utilized as a supplementary system with existing moving target indicator radar systems and thus has wide applicability.

BRIEF DESCRIPTION OF THE DRAWINGS

FIGS. 1A through 1C illustrate, respectively, the frequency rejection function of notch filters for a set of PRF's 1 through 3 incremented in frequency in a ratio of 1.25:1.0;

FIG. 1D is a frequency plot illustrating the rejection function accomplished in prior art systems through use of notch filters;

FIG. 1E comprises a frequency plot of the rejection function utilizing the post threshold cancellation technique of the invention; and FIG. 2 comprises a block diagram of a post threshold cancellation system in accordance with the invention.

DETAILED DESCRIPTION OF THE INVENTION

The post threshold cancellation system and method of the invention is useful with substantially all radar systems of the coherent low pulse rate frequency (hereinafter PRF) airborne moving target indicator (hereinafter AMTI) types. In general, the invention is useful with any coherent pulsed type radar systems. As before noted, it is known to eliminate stationary targets through use of suitable notch filters. As well, it is known to utilize one or more sets of plural PRF per sets in avoiding so-called blind speeds, and wherein the PRF's are chosen to minimize the possibility that a moving target may fall in a notch in more than one PRF. As well, the band width of the notches is controlled and generally made as narrow as possible to enhance the visibility of the moving targets. It is also well known that the frequency cancellation function of the notch filters is periodic at the PRF. Certain of their functions are represented in FIG'S. 1A–1D.

More specifically, in FIGS. 1A, 1B, and 1C are provided frequency plots of the periodic notch filter cancellation function for those PRF's, labelled PRF's 1, 2, and 3 respectively, and comprising three pulse repetition frequencies of a set. The relationship of these frequencies may be selected in accordance with desired conditions of prior art systems and moreover to optimize the operation afforded by the system and method of the invention as later detailed. As specifically shown, PRF's 1, 2, and 3 are incremented in frequency by a multiplier of approximately 1.25. In these figures the notation $fr$ represents the transmission periodicity and, in the case of pulse radars, $fr$ corresponds to the PRF. Accordingly, the subscripts 1, 2, and 3 appear with the notations $fr$ in accordance with the designations PRF 1, 2, and 3 respectively. The notch filters are selected to have band widths of $0.5 fr_1$ and are centered at the PRF, their cancellation functions being represented by the cross-hatched regions in each of FIGS. 1A through 1C. Specifically, it will be appreciated that the base band notch extends from 0 frequency, or DC, up to $0.25 fr_1$ in the case of FIG. 1A and the full notch band width of $0.5 fr_1$ is then centered at each periodic frequency function $fr_1$, $fr_2$, ... illustrated for PRF 1. The same notch band width, as noted, is utilized in the case of PRF 2 and PRF 3 and thus corresponding notch rejection areas appear as the base-band cross-hatch regions in FIG.'S 1B and 1C and as well at the periodic functions.

In FIG. 1D is shown the rejection accomplished in conventional prior art systems utilizing notch filters. Particularly, rejection is accomplished in those instances when the target falls within the notch of each of PRF 1, 2, and 3. Accordingly, the base-band rejection shown as the cross-hatched region 10 in FIG. 1D corresponds to the notched base-band regions of FIGS. 1A, 1B and 1C and thus extends identically from 0 to $0.25 fr_1$. Ground, or stationary targets and very slow-moving (likewise ground) targets thus are cancelled in this range.

An example of a blind speed is also illustrated in FIG. 1D in the cross-hatched area 12 corresponding to the common frequency range encompassed within the cross-hatched rejection areas of PRF's 1, 2, and 3, as illustrated. As noted, to avoid blind speeds in the ultimate display, plural sets of PRF's may be employed in which these undesired rejection bands as illustrated by the cross-hatched area 12 are displaced in frequency from one another. Thus, by sampling in rapid succession the plural sets of PRF's in producing the final video display output, the blind speeds are avoided.

In analyzing the rejection function, slow targets, defined as those having doppler frequencies less than $0.75 fr_1$ and which do not fall within the base band notch 10, will fall outside the notches in all three PRF's of the set (with the exception of the blind speed notch but which is eliminated as above noted). Such low radial velocity targets, though undesired, thereby have a high probability of being detected and appearing in the display.

The rejection function in accordance with the invention is shown in the frequency plot of FIG. 1E. As before noted, the basic technique of the invention is to inhibit the display of slow moving targets which appear out of the notches in all of the PRF's of a set, in conjunction with maintaining the cancellation function obtained in the prior art. Accordingly, in FIG. 1E the notch cancellation function includes the base-band region from 0 to $0.25 fr_1$ as in the prior art plot of FIG. 1D, and as well the region from 0.25 through $0.75 fr_1$, the total rejection or cancellation thus extending from 0 to $0.75 fr_1$, as illustrated by the cross-hatched region 14. As is apparent, frequency rejection in accordance with the invention is increased by a factor of at least three to one relative to that of conventional rejection techniques, for low radial velocity targets, and hence throughout what is characterized as ground moving target rejection band (GMTR).

The cancellation technique of the invention also produces a blind speed rejection band 16 corresponding to band 12 in FIG. 1D and additional blind speed rejection bands 18 and 20 as a result of these frequencies appearing out of the notch in all three PRF's of the set. These factors can be improved by use of more than one set of PRF's, and further, by optimizing the PRF's selected and the notch widths. Nevertheless, the desirable result of a three to one increase in the GMTR band rejection over conventional systems is realized with less than a 9 percent reduction in target visibility for faster targets.

In FIG. 2 is shown a block diagram of a post threshold cancellation system in accordance with the invention. The block diagram of FIG. 2 is to be understood as an illustrative system suitable for performing the cancellation functions in accordance with the teachings of the invention. Furthermore, the system is here illustrated for processing a single set of three PRF's. The necessary modifications for processing a greater number of PRF's per set and for utilizing plural sets of PRF's for purposes as above discussed will be apparent.

A number of data storage registers 30, 32, 34, are provided corresponding to the number of PRF's of a given set, each of these registers having a number of bit storage positions corresponding to the number of range cells in the highest PRF of the set. This is illustratively indicated by the notation $n$ bits. There is further provided an inhibit storage register 36 likewise having $n$ bit storage positions. Each of the storage registers thus is adapted to store $n$ bits of information and, through control and gating circuits, provides for receiving and storing those $n$ bits and recirculating them in a manner to be described. In general, the control system 38 controls this function by activating clock pulse source 40, the output of which is supplied as a shift input to each stage of each of the storage registers. The clock pulse source 40 generates $n$ pulses each time it is activated, in a manner and for a purpose to be described. It will be understood that the registers may comprise shift registers or other suitable form of digital storage device.

The data to be stored in the registers 30, 32, and 34 comprises the video display information produced by the AMTI system. Generally, and as is well known, decisions as to enabling or inhibiting display cannot be made until the data from an entire dwell has been received and appropriately stored in the system. In accordance with standard techniques, where plural PRF's are employed, a single PRF is transmitted for a period of time termed a look; thus, the plural PRF's are transmitted individually and in succession during corresponding, successive looks. Further, it is typical to integrate over all pulses of a given PRF such that subsequent processing and decision functions are performed only with respect to a single block of information representing the target return intervals for $n$ range cells, regardless of the total number of pulses transmitted during a look of a given PRF. Finally, the signals derived from the integration of received data for a given PRF are subjected to a thresholding operation prior to final processing for the decision functions as to inhibit or display.

In FIG. 2, therefore, these known processes are illustrated by the post detection integrator 42, labelled PDI, which receives the video from the AMTI system and supplies it to a gating or level-setting circuit 44 controlled by a threshold level signal from a threshold level adjustment circuit 46, the latter being automatically and/ or manually adjustable for selecting a desired threshold level.

Decision circuit 48 determines and identifies to the control circuit 38 the timing of the last interpulse period of each successive look. The control circuit 38 thereupon provides an enabling input to AND gate 50 which then permits the train of pulses representing the integrated values for the block of storage for the given PRF to be supplied to the input steering circuit 52.

Each PRF of the set is assigned to a specific one of the storage registers 30, 32, and 34 and, accordingly, control circuit 38 controls steering circuit 52 to supply the train of data through the appropriate output thereof for gating through the corresponding OR gates 31, 33, and 35 to the respectively associated storage registers 30, 32 and 34. Simultaneously, the control circuit actuates the clock pulse source 40 to produce $n$ clock pulses, which serve as shift pulses, to shift the train of $n$ data bits into the corresponding $n$ storage bit positions of the storage register thus selected.

It will be appreciated that the pulse rate of the $n$ clock pulses is, at a minimum, $(n) \, x \, (PRF_1)$ where That 1 is the lowest PRF of the set.

The data thus entered is recirculated in the storage registers each time the clock pulse source 40 is activated, in accordance with the clock pulse rate, and in synchronism for the plurality of registers. The recirculation paths for the registers include the respectively associated AND gates 60, 62, and 64 and the input OR gates 31, 33, and 35, the outputs of which are connected to the inputs of the registers 30, 32 and 34 respectively. As later described, the AND gates 60, 62 and 64 are enabled selectively to permit the recirculation by a second output supplied through the related inverters 61, 63, and 65 from the input steering circuit 52.

Output steering circuit 70, furthermore, is enabled by control circuit 38 to select as an output the block of signals from the data storage register containing the oldest data. The output, however, is subjected to the inhibit function for cancelling any target signals which are simultaneously present for all PRF's for the corresponding range cells, in the manner now to be described.

In accordance with the operation of the system of the invention as described in conjunction with the frequency plots of FIGS. 1A through 1C and 1E, it will be appreciated that the inhibit function is first operable when a complete block of information for each PRF has been stored in the appropriate registers. It is assumed, of course, that all registers are cleared initially. Since these registers recirculate in synchronism for each activation of the clock source, the corresponding bits of the plural registers are presented in parallel and in succession at the outputs of those registers. Accordingly, target signals occurring outside the notch cancellation regions for each PRF result in simultaneous presentation of corresponding data bit signals, such as logic 1's, at the outputs of these registers. AND gate 72 accordingly is enabled to produce an output identifying this condition, and which is supplied through OR gate 74 and inverter 76 as an inhibit, or logic zero input to the output AND gate 78, thereby disabling it. The target signal corresponding to that inhibit output thereby is cancelled from the output of steering circuit 70 to supply the synthetic video output of AND gate 78.

The pattern of inhibit signals produced through AND gate 72 is also supplied through OR gate 80 to the inhibit storage register 36. Thus, during the recirculation cycle in which the blocks of information for all PRF's of the set recirculate in synchronism in the registers 30, 32 and 34, the comparison function afforded by AND gate 72 serves to inhibit the slow moving target signals from the output of the system, and as well to enter a bit pattern representative of those inhibit functions through OR gate 80 into the inhibit storage register 36. A recirculation loop for the inhibit storage register 36 is afforded through AND gate 82 and OR gate 80, so long as AND gate 82 receives as a second input an enable output from the OR gate 73.

More specifically, OR gate 73 has three inputs receiving the outputs of the data storage registers 30, 32, and 34 in parallel. As long as a target signal is present in any storage position of any register, OR gate 73 is enabled and in turn enables AND gate 82 to maintain the recirculation. As a result, once an inhibit signal is generated and stored, it is maintained by recirculation during succeeding looks and storage of new blocks of target return signals as to each PRF, until such time as that target signal is absent from all of the corresponding bit storage positions with respect to which the inhibit was initially generated.

Furthermore, each new block of information entered into a data storage register currently being cleared then develops, through AND gate 72, a new inhibit pattern as above described, and which simultaneously provides the output inhibit function and is read into the inhibit register 36 through OR gate 80. Cleaning of the data storage registers is accomplished readily and may be done simultaneously with the entry of a new block of data.

Specifically, recirculation of the stored data is inhibited by disabling the AND gates 60, 62, and 64 during these intervals in which the steering circuit 52 provides a new block of data to the corresponding storage register. The disable function is illustrated as being performed by removing the enabling input to the AND gates 60, 62, and 64 normally supplied through inverters 61, 63 and 65 from the input steering circuit 52 when the main control system 38 directs the circuit 52 to steer a new block of data into a given one of the registers 30, 32 and 34.

It will be apparent that further gating and control functions may be provided. For example, a redundancy may exist as to the inhibit bit pattern as produced by the inhibit storage register 36 during recirculation and as generated through AND gate 72 during the simultaneous recirculation of the data storage registers 30, 32, and 34. In a different sequence of operation, however, it may be desirable to maintain the inhibit pattern in the register 36 for one or more additional recirculation times following entry of a new block of data into one of the data storage registers. This would permit, for example, read out of a PRF pattern from a given storage register and clearing of that register prior to reading in a new block of information, during which time the inhibit storage register can maintain the inhibit function and then, at a later cycle, the inhibit storage register can be read out completely and cleared, prior to entry of a new inhibit pattern therein and during which interval of time the inhibit function can be performed exclusively by the output of the AND gate 72.

As will be apparent, numerous systems can be designed for performing the post threshold cancellations scheme of the invention. As noted, in a practical system, plural sets of PRF's are employed with appropriate gating and control circuits to avoid blind speeds; as well, by appropriate selection of the relative PRF's of each set and of the number of sets and of the notch filter band widths, optimization of the cancellation function for enhanced visibility of the moving targets to be displayed may be realized. Accordingly, it is intended by the appended claims to cover all such modifications and adaptions of the method and system of the invention as fall within the true spirit and scope of the invention.

What is claimed is:

1. A method of increasing the rejection of slow-moving targets in a moving target indicator system employing a set of related pulse repetition frequencies and notch filters of a selected band width and center frequency associated with each such pulse repetition frequency, comprising:

storing a block of target return signal information comprising a predetermined number of range cells selected in relation to the pulse repetition frequencies in succession for each pulse repetition frequency of the set, to indicate the presence or absence of a target signal return in each such cell;

comparing the target signal information thus stored for the corresponding cells of each pulse repetition frequency, for all cells in succession, to produce an inhibit output for each target signal appearing simultaneously in the corresponding cells of all pulse rate frequencies of the set;

producing a video display output from the stored blocks of target signal return information; and inhibiting the display of any target as to which an inhibit output is produced in the comparing step.

2. A method as recited in claim 1 wherein each pulse rate frequency is transmitted during a corresponding look, further comprising:

providing storage means for each block of target return information;

steering each block of target signal return information into the respectively corresponding storage means for the plurality of pulse rate frequencies of the set in succession; and deriving the video signal output from the storage means containing the oldest block of return signal information.

3. A method as recited in claim 2 further comprising:

storing the pattern of inhibit outputs produced by the comparing step;

successively clearing a previously stored block of information for each pulse rate frequency for subsequent storing of a new such block for that same pulse rate frequency in succession for the plurality of pulse rate frequencies; and successively updating the stored pattern of inhibit outputs in accordance wit comparison of each such new block of signal return information with remaining, previously stored such blocks for the other pulse rate frequencies of the set.

4. A method as recited in claim 1 further comprising:

providing a plurality of data registers each having a number of storage positions corresponding to the number of range cells in each of the pulse repetition frequencies of the set, comparing the output of each of the data storage registers simultaneously for the plurality of recirculating storage positions therein, in succession, to develop an inhibit output in accordance with the simultaneous presence of a stored indication of a target signal return in the corresponding storage positions of all such registers; and storing the inhibit outputs thus developed in the corresponding storage positions of the inhibit storage register.

5. A method as recited in claim 4 further comprising:
deriving a video display output signal from the data storage register currently recirculating therein the oldest block of target return signal information;
inhibiting the video signal display in accordance with the inhibit outputs synchronously recirculating in the inhibit storage means;
clearing each data storage register for receipt of a new block of target return signal information, for the plurality of the data of storage registers in succession, and
updating the inhibit outputs stored in the inhibit storage register upon storage of each new block of target signal returns stored in the data storage registers in accordance with comparison thereof with the remaining, previously stored such blocks.

6. A method as recited in claim 1 wherein the pulse rate frequencies of the set are incremented in frequency by a common multiplier.

7. A method as recited in claim 6 wherein the notch filter associated with each pulse rate frequency has a common band width of a preselected fraction of $fr_1$ wherein $fr_1$ corresponds to the lowest pulse rate frequency of the set.

8. A system for increasing the rejection of slow-moving targets in a moving-target indicator system employing a set of related pulse repetition frequencies and notch filters of a selected band width and a center frequency associated with each such pulse repetition frequency, comprising:
means for storing a block of target signal return information comprising a predetermined number of range cells selected in relation to the pulse repetition frequencies, said storing means respectively corresponding to the pulse repetition frequencies and each said storing means including a number of storage positions corresponding to the number of range cells for storing an indication of the presence or absence of a target signal return in each such cell;
means for selectively gating each said block of target signal return information, in succession for the pulse repetition frequencies of the set, into the respectively corresponding storing means;
means for synchronously recirculating the stored information in said storing means and for selectively clearing each thereof for receipt and storage therein of a new block of information, in cyclic succession;
means for comparing the target signal information thus stored in the storage positions of the plurality of storing means for the corresponding cells of the plural pulse repetition frequencies, for all such corresponding storage positions in succession, and producing an inhibit output for each group of corresponding storage positions simultaneously containing indications of target signal returns for the corresponding cells of all pulse rate frequencies of the set;
means for producing a video display output from the stored target signal return information; and
means for inhibiting the display of any target as to which an inhibit output is produced by said comparing means.

9. A system as recited in claim 8 wherein said video display output producing means derives the video display output from the storing means currently containing the oldest block of target returns signal information.

10. A system as recited in claim 8 wherein said storing means comprise a plurality of shift registers corresponding in number to the number of pulse repetition frequencies of each set, and each said shift register having a number of storage positions corresponding to the predetermined number of range cells.

11. A system as recited in claim 10 wherein the number of storage positions of each shift register is no greater than the number of range cells in the highest pulse repetition frequency of the set.

12. A system as recited in claim 10 wherein said inhibiting means comprises:
an inhibit storage register having a number of storage positions corresponding to those of the information storage registers for storing the inhibit outputs produced by said comparing means and for recirculating the inhibit pattern thus established; and
means for disabling the recirculation of a stored inhibit pattern and for storing in said inhibit storage register a new inhibit pattern as produced by said comparison means upon receipt and storage in one of said information storage registers of a new block of target signal return information.

13. A system as recited in claim 8 wherein said selective gating means comprises:
a post detection integrator for receiving a video display signal from a moving target indicator system;
means identifying the last interpulse period of each successive look corresponding to the succession of pulse repetition frequencies; and
input steering means enabled upon the identification of the last interpulse period of each successive look to steer a block of target-return signal information from said integrator to the corresponding storing means for the given pulse repetition frequency for each of the pulse repetition frequencies in succession.

14. A system as recited in claim 13 wherein there is further provided threshold level setting means for receiving the output of the post-detection integrator and supplying that output to said steering means.

15. A system as recited in claim 13 wherein said means for producing a video display output comprises output steering means associated with each of said storage means for selecting and steering as an output the information stored in a given one thereof representing the oldest block of target return information.

* * * * *